United States Patent [19]
del Notario

[11] 4,014,962
[45] Mar. 29, 1977

[54] HEAT AND/OR MASS EXCHANGER OPERATING BY DIRECT CONTACT BETWEEN A LIQUID AND A GAS

[76] Inventor: Pedro Perez del Notario, Zamudio (Vizcaya), Spain

[22] Filed: Apr. 2, 1975

[21] Appl. No.: 564,356

Related U.S. Application Data

[63] Continuation of Ser. No. 342,800, March 19, 1973, abandoned.

[30] Foreign Application Priority Data

Mar. 23, 1972 Spain .................................. 401117

[52] U.S. Cl. .............................. 261/112; 165/177; 261/DIG. 11; 261/DIG. 72
[51] Int. Cl.² ........................................... B01F 3/04
[58] Field of Search .................. 261/94–98, 261/112, DIG. 72, DIG. 11; 165/177

[56] References Cited
UNITED STATES PATENTS

| | | | |
|---|---|---|---|
| 910,192 | 1/1909 | Grouvelle et al. ............. | 165/177 X |
| 1,922,838 | 8/1933 | Bossart ............................. | 165/177 |
| 2,394,023 | 2/1946 | Strickland ......................... | 261/95 |
| 2,615,699 | 10/1952 | Dixon .............................. | 261/95 X |
| 2,917,292 | 12/1959 | Hittrich ........................... | 261/112 X |
| 3,200,877 | 8/1965 | Lehmer et al. ................... | 261/94 X |
| 3,358,749 | 12/1967 | Chisholm et al. ................ | 165/177 X |
| 3,525,391 | 8/1970 | Day ................................. | 261/112 X |
| 3,599,943 | 8/1971 | Munters .......................... | 261/112 X |
| 3,704,869 | 12/1972 | Priestley .......................... | 261/112 |
| 3,738,626 | 6/1973 | Norback ........................... | 261/112 |

*Primary Examiner*—Tim R. Miles
*Assistant Examiner*—Richard L. Chiesa

[57] ABSTRACT

Heat and/or mass exchanger operating by direct contact between a liquid and a gas comprising a cooling tower, of the type having a casing in which is disposed a filling through which the liquid and the gas circulate. The filling is constituted of a plurality of independent tubular elements whose cross-section varies along the length of the tubular elements. The tubular elements are preferably disposed with their axes vertical and parallel to define internal and external passages of variable section. The tubular elements vary in cross-section in continuous manner throughout their length and the section variations recur periodically along the length of the tubular elements.

4 Claims, 7 Drawing Figures

Fig. 3
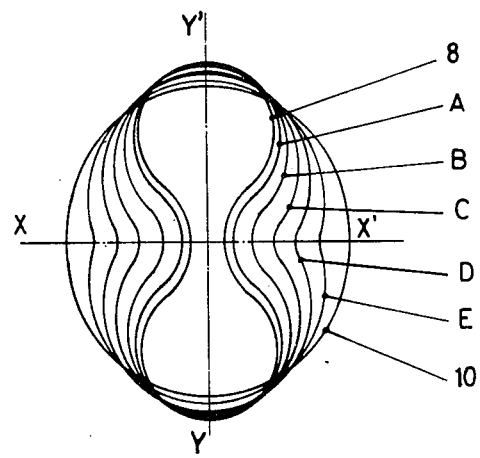
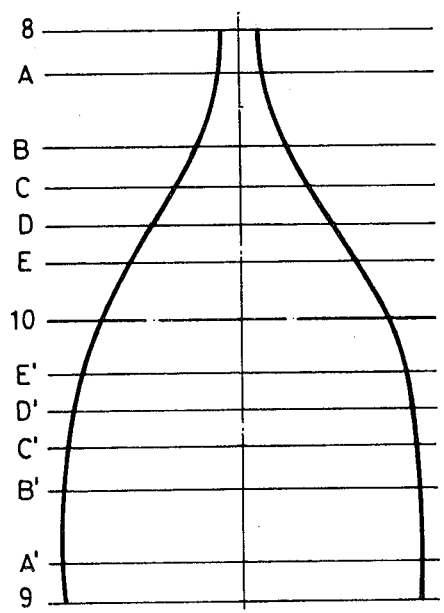
Fig. 4

Fig. 5
Fig. 6
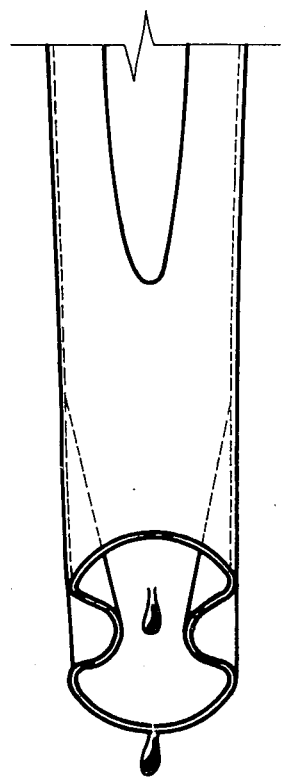
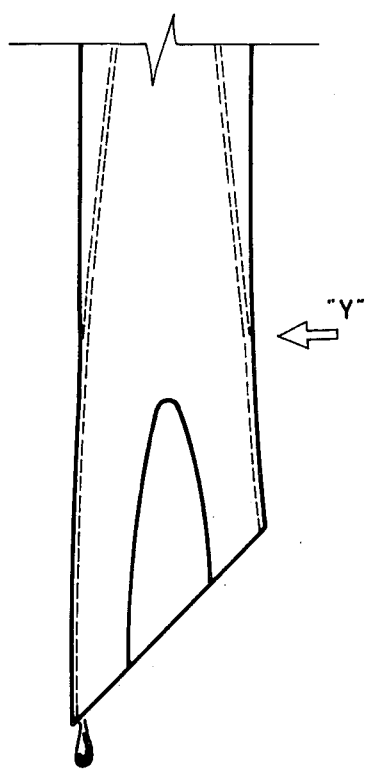

HEAT AND/OR MASS EXCHANGER OPERATING BY DIRECT CONTACT BETWEEN A LIQUID AND A GAS

CROSS-RELATED APPLICATIONS

This application is a continuation of copending application Ser. No 342,800 filed Mar. 19, 1973 (now abandoned) and claims the priority of the application filed in Spain on Mar. 23, 1972.

BRIEF SUMMARY OF THE INVENTION

The present invention relates to improvements in heat and/or mass exchangers operating by direct contact between a liquid and a gas, especially in exchangers known as cooling towers, which comprise a casing in which is contained a filling through which the liquid and the gas circulates.

In heat exchangers of the type indicated, the two fluids, i.e. liquid and gas, circulate in direct contact. The liquid is introduced at the upper portion of the filling by sprinkling, whereas the gas is blown-in at a predetermined pressure from the lower portion thereof, or laterally, in such manner that the liquid and the gas circulate in counterflow or enclose a predetermined angle between them.

Heat exchangers of this type are utilized for example in cooling installations where it is required to cool water by contact with the air blown in, which is colder, and by evaporation of part of the liquid due to the action of the air flow.

In order to obtain a large liquid-gas contact surface and, thereby, maximum cooling of the liquid, a filling is provided which serves as support means for liquid circulation.

The thinner the film of liquid circulating in the filling, the greater will be the contact between the liquid and the gas and, consequently, the greater will be the heat transmission.

It is also desirable in such installations, for increasing heat transmission, that the liquid should undergo variation in velocity during its circulation in the filling.

The transmission of heat will, furthermore, be proportionately greater as the time of dwell of the liquid in the filling is longer.

The output of the installation will be proportionately increased as the surface of the filling is better utilized, i.e. in proportion as the surface of the filling wetted by the liquid is larger.

On the basis of these and other principles, various types of filling for cooling towers have been developed, giving preference, in the majority of cases, to some conditions relative to others without, however, achieving the optimum combination of all such conditions.

Conventional fillings of sheet or plate type are constituted by planar sheets or plates which are corrugated or of channelled shape.

In the first case, when the fillings are constituted on the basis of planar sheets or plates, the liquid circulates with excessive velocity without appreciable velocity variation, so that a form of circulation which is ideal for the objective which it is desired to attain is not achieved thereby and the heat transmission achieved is small.

In fillings constituted by corrugated or channelled plates, it is possible to achieve, by "intercrossing" the plates, consecutive passages of variable shape, the result thereof being variation of the liquid circulation velocity, but nevertheless the passage section remains constant.

It is an object of the present invention to provide a filling for heat and/or mass exchangers which, while satisfying the conditions discussed hereinabove, affords furthermore, gas passage section variations such that slight degrees of compression and expansion of the gas are obtained, thereby producing a state of turbulence which improves the mixing thereof and consequently also increases the gradient of temperature and vapor concentration in the liquid-gas contact zone.

It is a further object of the invention to provide a self-supporting, highly rigid filling, and this is achieved due to the special configuration of the elements of which the filling consists.

According to the invention, the filling is constituted on the basis of independent tubular elements the cross-section of which varies both with regard to shape and with regard to passage area along the length of said elements, the elements being preferably disposed with their axes vertical and parallel, thereby defining internal and external passages of variable section.

The tubular elements vary as to section in continuous manner throughout their length, such section variations recurring periodically along the tubular elements.

In the subsequent text, the term "wave" will be employed to designate that length of the tubular element which recurs periodically lengthwise thereof.

In the filling constructed in accordance with the invention, the liquid descends in contact with the internal and external surfaces of the tubes and the gas ascends within the latter and through the space between the outer surfaces of the said tubes, thereby utilizing the entire surface for the gas-liquid contact.

The aforementioned section variation in respect of the tubes affords section variations in the air passage, both within and externally of the tubes, thus producing slight compressions and expansions of the gas and thereby increasing the turbulence thereof.

Due to the shape of the tubes, the liquid is periodically accelerated and decelerated during its descent, thereby facilitating mixing of the liquid and increasing the time of dwell of the latter in the filling. This object is achieved with a small loss of gas pressure, so that this type of filling affords a high operational capacity.

The tubes have no surfaces formed with angular protuberances, so that the liquid, as it descends, wets the entire surface of the filling, thereby utilizing the entire surface as a transmission surface.

In order that the air may penetrate into the tubes, the latter are cut to pointed or bevelled shape, thereby facilitating constant trickling at the tip of the tube which recovers all the liquid descending at the inner and outer surfaces of each one of said tubes. In this manner, the loss of pressure is diminished and the liquid-gas contact surface is increased.

The surface of the tubular elements may be smooth or rough; in the latter case, the tubulence of the streams of liquid and gas is improved and, thereby, the transmission efficiency of the surface is increased.

The dimensions of the central section of the tubular elements may vary within wide limits, for example, between 1 centimeter and 20 centimeters in diameter, and preferably between 3 centimeters and 10 centimeters. In every case, the diameter, "wavelength" and length of the tubular element may be pre-selected for each specific and particular application.

The tubular elements are arranged relative to each other to constitute the filling, in contact with each other, in the form of clusters.

The tubular elements are arranged relative to each other preferably in such manner that at the two end sections of the cluster, the passage section internally and externally of the tubular elements will be equal. Thereby, there is achieved a uniformly arranged distribution of the streams of liquid and gas through the filling.

The filling may be constituted by two or more tiers of clusters.

As stated hereinabove, the tubular elements may have, at least their lower ends bevelled or cut to pointed shape, i.e. cut along a plane which is not perpendicular to their axis, whereas their upper end may be cut along a plane perpendicular to the aixs, or the two ends of the tubular elements may be cut in planes perpendicular to their axes.

The tubes are secured within the tower, bearing directly on a support constituted by a mesh structure or perforated plate which offers only little resistance to the passage of air and does not impede the uniform distribution of the gas flow. The support is disposed at the lower portion of the filling and secured to the tower structure.

It is a further advantage of the filling of the invention that the number of elements which may be introduced into a fixed casing is variable within wide limits, so that the compactness of the filling will vary in accordance with the particular requirements of each mode of application.

BRIEF DESCRIPTION OF THE DRAWING

The characteristics discussed hereinabove and the constitution of the filling will be more readily understood on reading the following description given with reference to the accompanying drawings in which there is shown, by way of non-limitative example, a practical embodiment, in which:

FIG. 3 is a plan view of the tube showing various sections taken normal to the axis thereof;

FIG. 4 is a longitudinal section taken along the line X-X' of the tubular length or section shown in FIG. 2 which corresponds to a half wavelength;

FIGS. 5 and 6 are a front and lateral view of a tubular element, showing the lower bevelled end.

DETAILED DESCRIPTION

Figure 1:
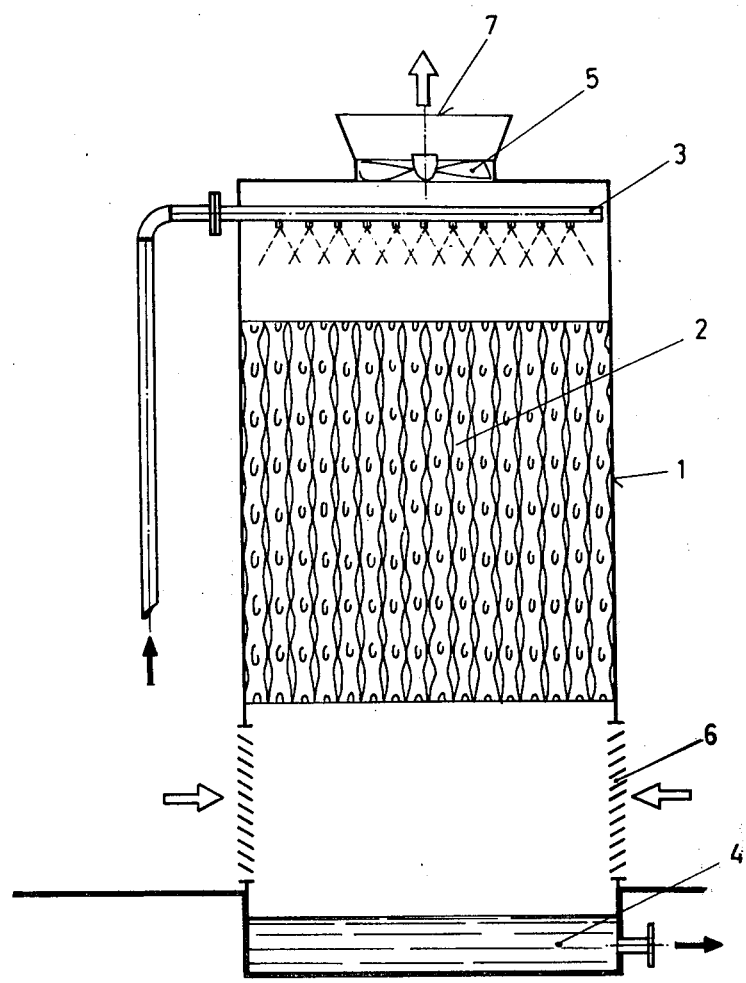
FIG. 1 is a diagrammatic, vertical section through a cooling tower having a filling constituted in accordance with the invention.

As shown in FIG. 1, a conventional cooling tower comprises a casing 1 in which is disposed a filling 2 on the upper surface of which water is uniformly distributed by means of a distributor 3. The lower portion 4 of the casing 1 constitutes a collecting reservoir where the cooled water is recovered for utilization thereof. A fan 5 circulates air from inlet apertures 6 towards an outlet 7 through the filling 2. The fan 5 may also be disposed in the lower portion.

Figure 2:
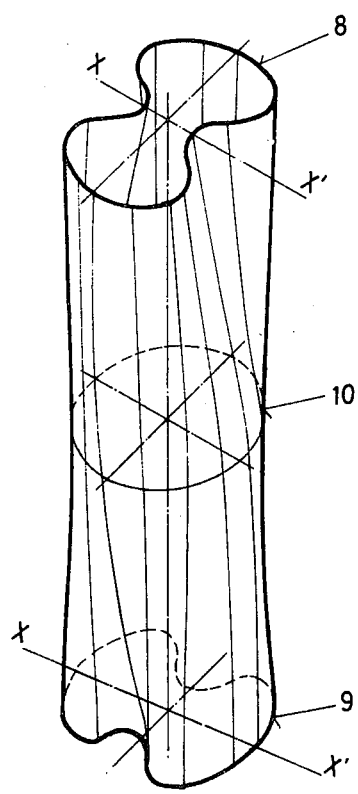
FIG. 2 is a perspective view of a portion of the tubular element comprised between two minimum passage sections.

The filling 2 is constituted, in accordance with the invention, on the basis of tubular elements varying in section lengthwise of the tubular elements, and which abut each other. FIG. 2 shows a portion or section of a tubular element comprised between two minimum passage sections 8 and 9. Between these sections, as may be seen in FIG. 2, the section variation is continuous and it also recurs periodically along the tubular element.

The "half-wave" shown in FIG. 2 has an intermediate section 10 of circular shape. Although this section shape is preferred, it is possible to employ other different shapes, such as polygonal, elliptical, etc. provided that this shape corresponds to the section of passage and transition of each quarter wave to the following one.

The variation in section may be seen in the plan view of FIG. 3 which corresponds to a quarter wavelength of a tubular element, i.e. to the portion comprised between the sections 8 and 10 of FIG. 2.

This figure shows separate intermediate sections extending in planes normal to the axis of the tubular element, between the minimum section 8 and the maximum section 10 which have been given the references A, B, C, D and E.

In the upper half of FIG. 4 there are shown, on the axis of the tubular element, the positions of the sections shown in FIG. 3, from the minimum section 8 up to the maximum section 10. In the lower half there are shown, again on the axis of the tubular element, the section positions normal to the said axis and corresponding to those shown in the upper portion but rotated through 90°; these have been given the references A', B', C', D' and E', to indicate the correspondence in the said sections, 9 corresponding to 8 of the upper half.

In the example described, the section 10 is circular but it could vary in accordance with specific applications. The minimum passage sections 8 and 9 are rotated through 90° relative to each other, but the angle could vary between extremely wide limits.

The area of the sections at the ends of the tubular elements may vary in accordance with the arrangement of the tubes, although it is preferred that the air passage section should be uniform within and externally of the tubes, so as to achieve good air and water distribution. The area will be varied by cutting the tubular conduit between the minimum (8) and maximum (10) passage sections.

The lower ends of the tubes may be bevelled, as shown in FIGS. 5 and 6, whereby all the liquid wetting each tube is concentrated at the bevelled tip. In this manner, any "shielding" (screening) of the interior of the tube by the sheet or curtain of liquid descending at the surface is prevented.

Figure 7:
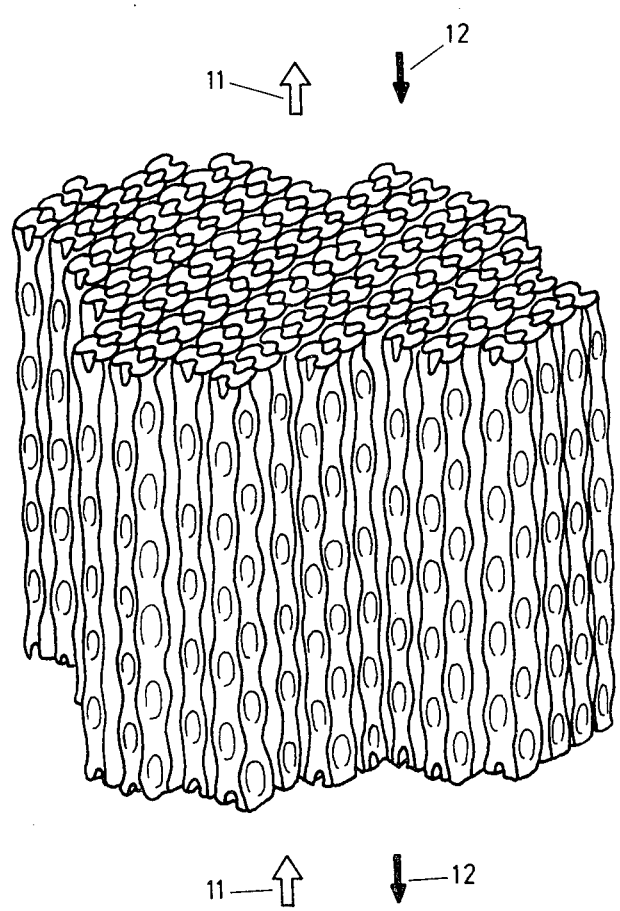
FIG. 7 is a perspective view of a cluster of tubular elements arranged in arbitrary form.

FIG. 7 shows, in perspective, a portion of the filling obtained due to the abutment of the tubular elements described hereinabove. Such tubular elements may be compacted to a greater or lesser extent in order to constitute the filling, depending on whether they are or are not arranged in staggered relationship. Furthermore, due to the mobility and independent arrangement of each tubular element, the shape of the section of the filling as a whole may be circular, square, polygonal, etc. Since the tubular elements have contact points in the filling, the contact points serve for distributing the liquid from some of the tubes to others, thereby facilitating the distribution of the liquid over the entire surface.

Referring to FIG. 7, the arrow which has been given the reference numeral 11 indicates the direction of gas circulation, whereas the arrows which have been given reference numeral 12 indicate the direction of liquid circulation.

What is claimed is:

1. Heat and or mass exchanger operating by direct contact between a liquid and a gas comprising a cooling tower including a casing and a filling disposed in said casing through which liquid and gas circulate in direct contact in opposite directions, said filling comprising a plurality of independent and separate tubular elements extending in parallel abutting relation to form a self-supporting cluster in said casing, support means in said casing for said tubular elements including a perforate structure on which said tubular elements directly bear, each element having a cross-section which periodically varies in shape and size along the length thereof in successive wave-lengths, said elements being disposed vertically and extending the entire height of the filling and defining internal and external passages of variable section in shape and size through which both liquid and gas circulate in direct contact, the internal passages being confined within the interior of the tubular elements whereas the external passages are collectively bounded by the external surfaces of the different tubular elements and the inner surface of the casing, said tubular elements being disposed such that the variations in section of the internal and external passages are periodically repeated therealong, the cross-sections of each element for every two consecutive variations in section at half wave-length positions being irregular and turned 90° relative to one another while the cross-section at the intermediate quarter wave-length positions is regular and gradually undergoes change in shape to said irregular cross-sections at the half wave-length positions, the tubular elements having axial generatrices which are of continuously changing curvature and means at the lower end of each tubular element defining a respective separate dripping point for such element.

2. An exchanger as claimed in claim 1 wherein said tubular elements are relatively disposed such that the inner and outer passages have the same passage area at the end sections.

3. An exchanger as claimed in claim 1 wherein said means at the lower end of each tubular element is formed by a cut in a plane inclined with respect to the axis of the element and is different for each tubular element, thus providing the separated dripping points, one for each tubular element irregularly distributed thereacross.

4. An exchanger as claimed in claim 1 wherein said irregular sections at half wave-length positions are of hour-glass shape and successively turned 90°, the sections at said quarter wave-length positions being circular.

* * * * *